United States Patent Office 3,374,090
Patented Mar. 19, 1968

3,374,090
PROCESS FOR THE EXTRACTION OF METALS
Archibald William Fletcher and Douglas Stewart Flett, Stevenage, England, assignors, by mesne assignments, to Thorium Limited, London, England
No Drawing. Filed Mar. 22, 1965, Ser. No. 441,902
6 Claims. (Cl. 75—97)

ABSTRACT OF THE DISCLOSURE

A method of recovering metal values from an aqueous phase in which the aqueous phase is mixed with an organic phase containing a dissolved metal salt of napthenic acid so as to exchange metal ions between the two phases.

---

This invention relates to the extraction of metals by exchange reaction with a more basic metal.

It has been found that metal values may be recovered from aqueous media containing them by extraction in accordance with the principle that a metal ion present as a salt of an oil-soluble organic acid in an organic phase can be replaced by a less basic metal in an aqueous phase, on contacting the aqueous and organic phases, according to the general equation:

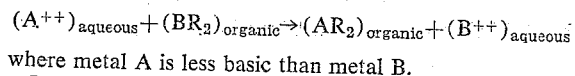

where metal A is less basic than metal B.

The metals normally encountered in hydrometallurgical processes can be arranged in the following order of increasing basicity:

(a) $Fe^{+++}$, (b) $UO_2^{++}$, (c) $Sn^{++}$, (d) Al, (e) Hg, (f) Cu or Cd, (g) PB or Ag or Zn, (h) Ni or Co or $Fe^{++}$, (i) Mn, (j) Ca or Mg.

The metal naphthenate of any metal in the above series will react, according to the above general equation, with all metals which are less basic, i.e. with metals which appear earlier in the series. Thus if the metal B is an alkaline earth metal, the exchange reaction will occur with all metals other than the alkaline and alkaline earth metals. If the metal B is nickel, the exchange reaction will occur, for example with $Fe^{+++}$, $Sn^{++}$, Cu, Zn and somewhat less readily with Cd. The exchange reaction becomes more difficult as the two metals concerned become closer in the given series. However, even with adjacent members of the series, it is possible to obtain an exchange extraction by using an excess of the more basic metal in the organic phase.

The invention is illustrated by the following examples:

*Example 1.—The extraction of ferric iron with copper naphthenate*

25.0 mls. of an aqueous solution, buffered at pH 2.1 and containing 4.58 g./l. Fe was contacted with different volumes of a kerosene solution of copper naphthenate containing 13.5 g./l. Cu. The two phases, at room temperature were mixed for ½ hour by stirring and then allowed to separate and were analysed for Cu and Fe. During the exchange extraction reaction the pH of the aqueous phase tends to rise but this may be overcome by the controlled addition of acid during extraction or by buffering the aqueous solution. If the pH rises too high an insoluble precipitate of a hydrolysed iron compound, (e.g. basic sulphate or hydroxide), is formed. The results given in Table 1 attached, show that the removal of iron from the aqueous phase with a mole ratio of $$Cu:Fe = 2.124:2.05$$

is so complete that it can only be detected in the p.p.m. range.

*Example 2.—The extraction of ferric iron with zinc naphthenate*

25 mls. of an aqueous solution buffered to pH 1.9, and containing 4.66 g./l. Fe was contacted with different volumes of a kerosene solution of zinc napthenate containing 28.0 g./l. Zn. The two phases at room temperature were mixed for ½ an hour by stirring and then allowed to separate and were analysed for Zn and Fe. In this system also it was necessary to prevent the pH rising too high during the exchange extraction reaction to avoid precipitation of insoluble iron compounds. The results given in Table II attached show that complete removal of iron is obtained with a mole ratio of Zn:Fe of 2.14:2.09.

*Example 3.—The extraction of nickel with manganese naphthenate*

25 mls. of an aqueous solution of pH 5.4 and containing 2.92 g./l. Ni was contacted with different volumes of a kerosene solution of manganese naphthenate containing 13.8 g./l. Mn. The two phases, at room temperature, were mixed for ½ an hour by stirring and then allowed to separate and analysed for Mn and Ni. With this system it was not necessary to control the pH during the exchange extraction reaction since insoluble precipitates were not formed. With this system larger quantities of the organic phase constituent are required for complete reaction than with the systems described in Examples 1 and 2. Thus the results in Table III attached show that a mole ratio of Mn:Ni = 6.28:1.24 is necessary to remove 94.17% of the nickel from the aqueous phase.

TABLE 1.—SYSTEM Cu NAPHTHENATE/Fe+++ AQ., BUFFERED AT pH 2.1

[Before contact]

| Organic Phase | | | Aqueous Phase | | |
|---|---|---|---|---|---|
| Assay Cu (g./l.) | Vol. Used (mls.) | Moles Cu (mmoles) | Assay Fe (g.l.) | Vol. Used (mls.) | Moles Fe (mmoles) |
| 13.5 | 5.00 | 1.062 | 4.58 | 25.00 | 2.05 |
|  | 10.00 | 2.124 |  |  |  |
|  | 15.00 | 3.186 |  |  |  |
|  | 20.00 | 4.248 |  |  |  |
|  | 25.00 | 5.310 |  |  |  |
|  | 30.00 | 6.372 |  |  |  |

[After contact]

| Aqueous Phase | | | Organic Phase | |
|---|---|---|---|---|
| Assay | | Percent Extrn-Fe | Moles Cu stripped (mmoles) | Percent Cu stripped |
| Cu (g.l.) | Fe (p.p.m.) |  |  |  |
| 3.05 | 150 | 100 | 1.2 | 100 |
| 4.15 | 10 | 100 | 1.635 | 77 |
| 4.09 | 10 | 100 | 1.61 | 50.5 |
| 4.20 | 10 | 100 | 1.65 | 38.9 |
| 4.20 | 10 | 100 | 1.65 | 31.1 |
| 4.15 | 10 | 100 | 1.635 | 25.7 |

TABLE II.—SYSTEM ZINC NAPHTHENATE/Fe$^{III}$ AQ BUFFERED AT pH 1.9

[Before contact]

| Organic Phase | | | Aqueous Phase | | |
|---|---|---|---|---|---|
| Assay Zn g./l. | Vol. Used (mls.) | Moles Zn (mmoles) | Assay Fe (g./l.) | Vol. used (mls.) | Moles Fe (mmoles) |
| 28.0 | 2.50 | 1.07 | 4.66 | 25.00 | 2.09 |
|  | 5.00 | 2.14 |  |  |  |
|  | 10.00 | 4.28 |  |  |  |
|  | 15.00 | 6.42 |  |  |  |
|  | 20.00 | 8.56 |  |  |  |

[After contact]

| Aqueous Phase | | | Organic Phase | | |
|---|---|---|---|---|---|
| Assay Zn (g./l.) | Assay Fe (g./l.) | Percent Extn-Fe | pH | Moles Zn Stripped (mmoles) | Percent Zn Stripped |
| 3.40 | 0.89 | 80.9 | 3.2 | 1.297 | 100 |
| 6.22 | N.D. | 100 | 4.3 | 2.375 | 100 |
| 8.17 | N.D. | 100 | 5.1 | 3.125 | 72.9 |
| 8.05 | N.D. | 100 | 5.2 | 3.07 | 47.8 |
| 8.17 | N.D. | 100 | 5.3 | 3.125 | 36.5 |

The abbreviation N.D. used above means "not detected".

TABLE III.—SYSTEM Mn NAPHTHENATE/Ni$^{II}$ AQ.—NOT BUFFERED

[Before contact]

| Organic Phase | | | Aqueous Phase | | |
|---|---|---|---|---|---|
| Assay Mn g./l.) | Vol. Used (mls.) | Moles Mn (mmoles) | Assay Ni g.(/l.) | Vol. Used (mls.) | Moles Ni (mmoles) |
| 13.8 | 5.00 | 1.256 | 2.92 | 25.00 | 1.24 |
|  | 10.00 | 2.512 |  |  |  |
|  | 15.00 | 3.768 |  |  |  |
|  | 20.00 | 5.024 |  |  |  |
|  | 25.00 | 6.280 | pH 5.4 |  |  |
|  | 30.00 | 7.536 |  |  |  |

[After contact]

| Aqueous Phase | | | Organic Phase | |
|---|---|---|---|---|
| Assay Mn (g./l.) | Assay Ni (g./l.) | Percent Extn. Ni | Moles Mn stripped (mmoles) | Percent Mn stripped |
| 1.84 | 1.01 | 64.5 | 0.838 | 66.8 |
| 2.29 | 0.48 | 83.6 | 1.04 | 41.4 |
| 2.39 | 0.32 | 89.05 | 1.057 | 28.8 |
| 2.43 | 0.25 | 91.44 | 1.105 | 22.1 |
| 2.43 | 0.17 | 94.17 | 1.105 | 17.6 |
| 2.43 | 0.15 | 94.86 | 1.105 | 14.7 |

We claim:

1. A method of recovering metal values from an aqueous media comprising mixing together an organic phase and an aqueous phase, said organic phase containing a metal ion formed by dissolving a metal salt of naphthenic acid in an inert organic solvent, said aqueous phase comprising an acidic aqueous solution containing a metal ion less basic than said first mentioned metal ion, said organic and aqueous phases being capable of separating on standing, said organic and aqueous phases being mixed sufficiently to exchange metal ions between the two phases.

2. A method as defined in claim 1 wherein both of said metal ions are selected from one of the groups (a) to (j) listed in order of increasing basicity of the series (a) $Fe^{+++}$, (b) $UO_2^{++}$, (c) $Sn^{++}$, (d) Al, (e) Hg, (f) Cu or Cd, (g) Pb, Ag or Zn, (h) Ni, Co or $Fe^{++}$, (i) Mn, (j) Ca or Mg, the metal ion in said aqueous phase being selected from a less basic group of said metal ions than the metal ion in said organic phase.

3. A method as claimed in claim 1 in which nickel ions are extracted from aqueous media by manganese naphthenate.

4. A method as claimed in claim 1 in which ferric iron is extracted from aqueous media by zinc naphthenate.

5. A method as claimed in claim 1 in which ferric iron is extracted from aqueous media by copper naphthenate.

6. A method as claimed in claim 1 in which the organic phase is kerosene.

References Cited

UNITED STATES PATENTS 3,055,754  9/1962  Fletcher _____ 75—97
3,149,134  9/1964  Fletcher _____ 23—339

HYLAND BIZOT, Primary Examiner.

RICHARD O. DEAN, DAVID L. RECK, Examiners.

N. F. MARKVA, Assistant Examiner.